May 7, 1946.　　B. M. HYMAN　　2,399,740
HARVESTER CONSTRUCTION
Filed April 20, 1942　　3 Sheets-Sheet 1
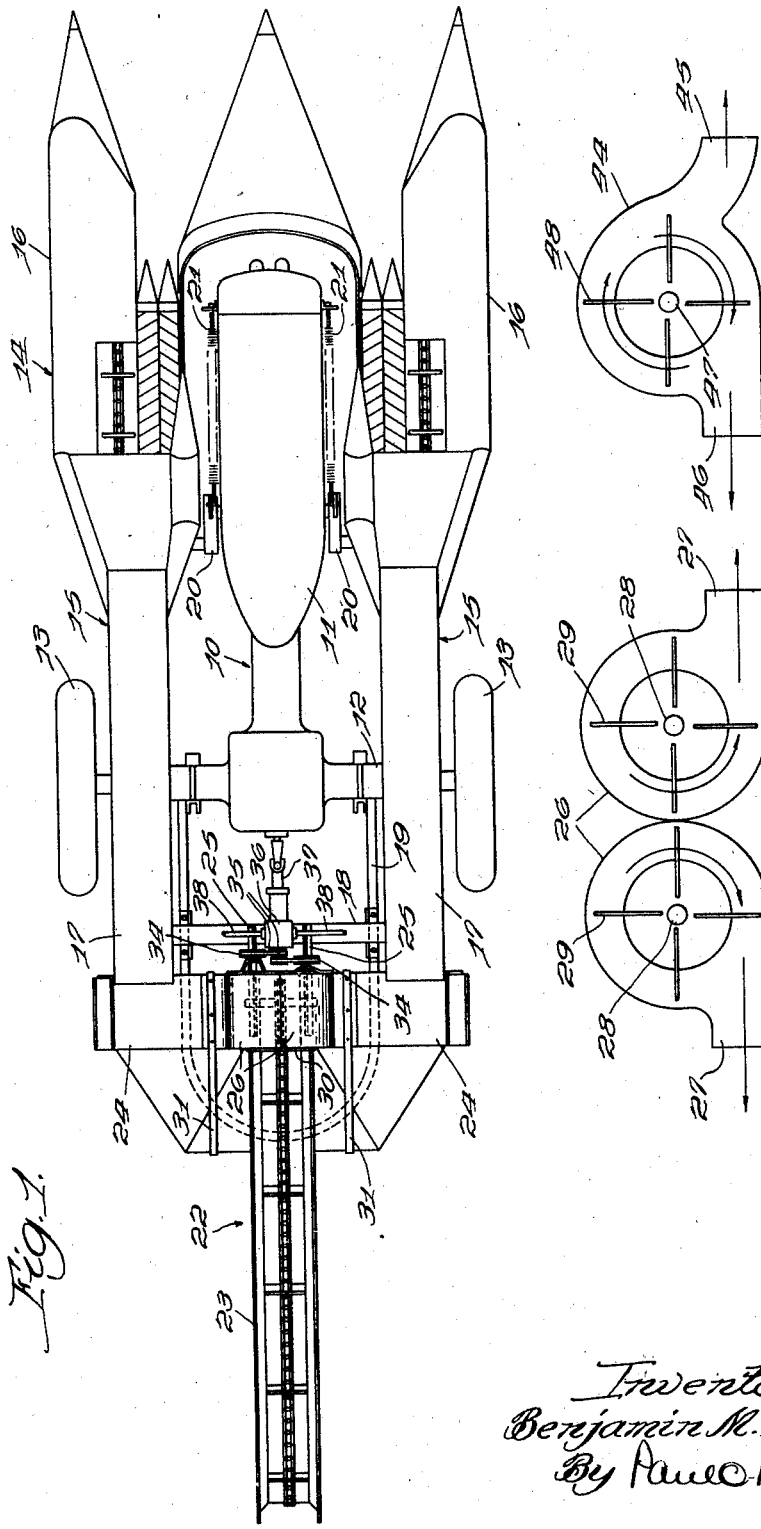

May 7, 1946.  B. M. HYMAN  2,399,740
HARVESTER CONSTRUCTION
Filed April 20, 1942   3 Sheets-Sheet 2

Inventor:
Benjamin M. Hyman
By Paul O. Pippel
Atty.

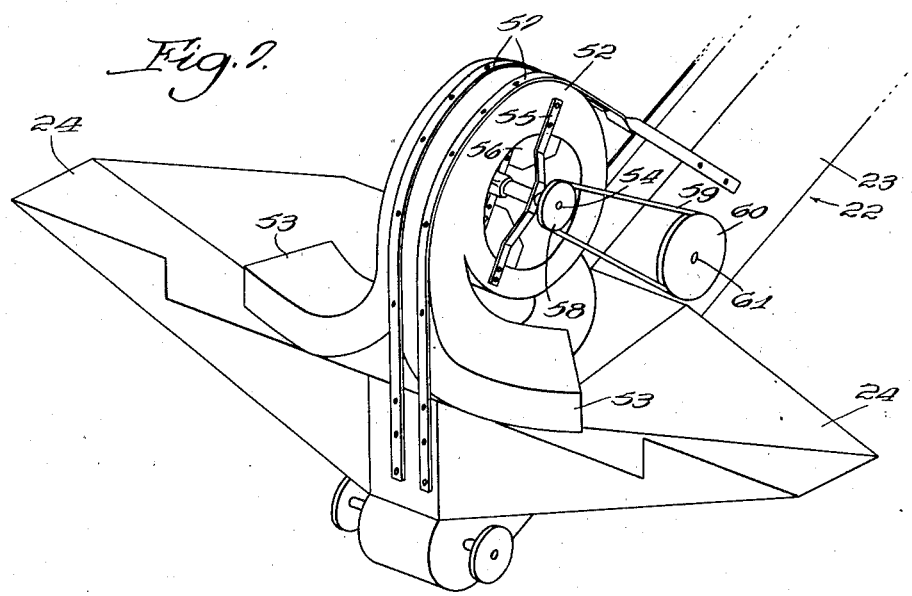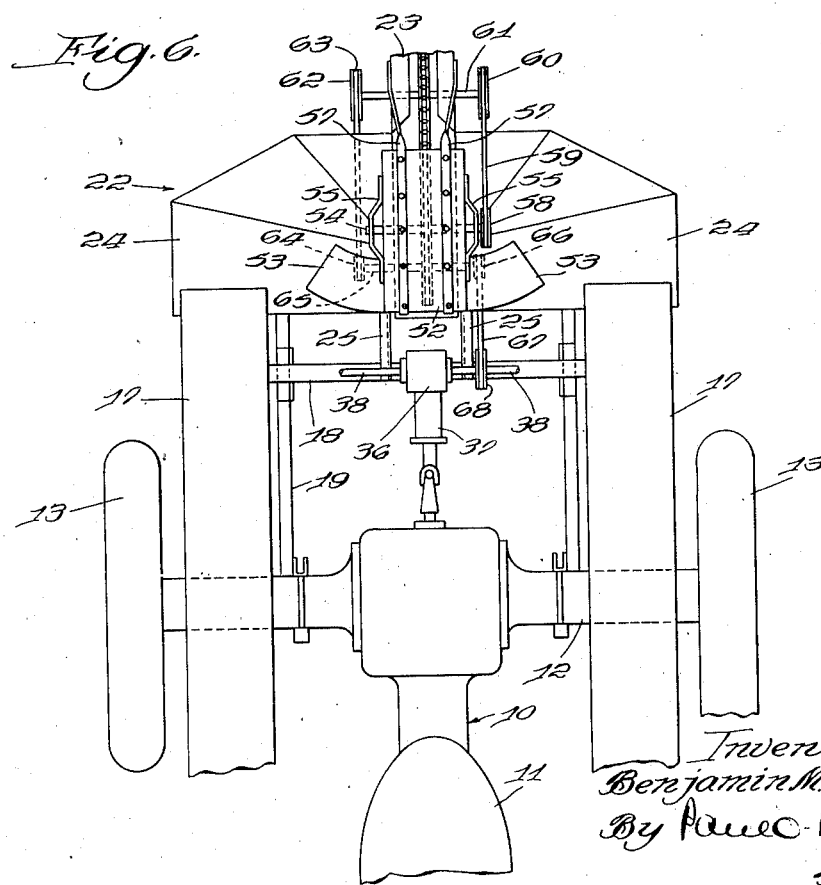

Patented May 7, 1946

2,399,740

UNITED STATES PATENT OFFICE 2,399,740

HARVESTER CONSTRUCTION

Benjamin M. Hyman, Moline, Ill., assignor to International Harvester Company, a corporation of New Jersey Application April 20, 1942, Serial No. 439,701

2 Claims. (Cl. 56—18)

This invention relates to a harvester construction. More specifically it relates to a fan for use with a corn picker.

The use of fans with corn pickers for separating loose husks and trash from corn ears is well known. In most cases the fans are formed in the husking units themselves. In the present application a fan or fans are used, which are separate from the other units.

An object of the present invention is to provide an improved harvester.

A further object is the provision of an improved corn picker.

Another object is to provide a novel fan arrangement for a harvester.

Still another object is the provision of a new mode of mounting a fan upon the harvester.

A further object is to provide an improved fan arrangement for a corn picker.

Other objects will appear from the disclosure.

According to the present invention, a fan or fans are mounted over the lower end of the wagon elevator so as to direct blasts of air along the chutes connecting the wagon elevator and the husking units against the flow of corn to the husking units from the wagon elevator.

In the drawings—

Figure 1 is a plan view of a tractor-mounted corn picker with fan means mounted thereon according to the novel mode of the present invention;

Figures 2 and 3 are enlarged schematic showings of the same means employed with the present invention;

Figure 6 is a plan view showing the rear portion of a tractor and a corn picker mounted thereon and a modified form of fan and mode of mounting the fan; and Figure 7 is a perspective view showing the modified form of fan of Figure 6 and its mounting upon a wagon elevator and chutes leading thereto.

Figure 4:
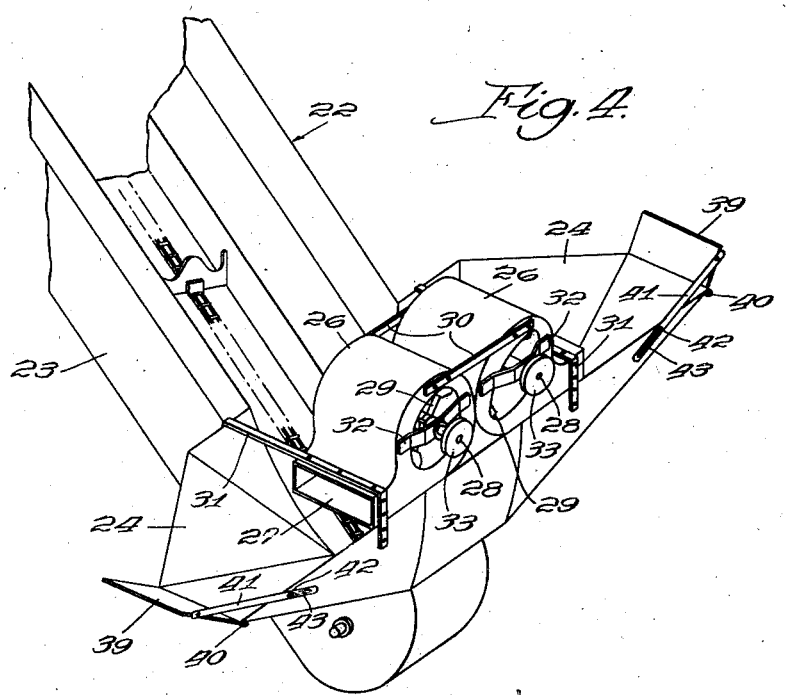
Figure 4 is a perspective view showing two fans mounted upon a wagon elevator and chutes leading thereto.

Reference character 10 designates a tractor which comprises a narrow body 11, a rear axle 12, and rear wheels 13 spaced from the body. Mounted upon the tractor 10 is a corn picker designated generally by the reference character 14 and comprising harvester units 15 positioned at opposite sides of the tractor body and extending across the rear axle 12. Each harvester comprises a picker unit 16 positioned adjacent the front of the tractor and a corn-handling unit 17 extending across the rear axle 12. The harvesters 15 are pivotally mounted adjacent their rear end on a transverse pipe 18 secured to a U-shaped drawbar 19 secured in turn at the rear of the rear axle 12. The forward ends of the harvesters 15 are raised and lowered by cranks 20 pivoted on the tractor body 10 and having connected thereto counterbalancing springs 21. Adjustment of the harvesters is effected through a hand lever which is not shown, since it forms no part of the present invention. The mounting of the harvesters 15 and the adjustment thereof is more fully shown in applicant's copending application Serial No. 407,538, filed August 20, 1941.

Positioned at the rear of the tractor and rearward of the corn-handling unit 17 is a unit 22 comprising a wagon elevator 23 and chutes 24 connecting the forward receiving end of the wagon elevator and the rear end of the husker units 17. The unit 22, composed of wagon elevator and chutes, is supported upon members 25 secured to the tube 18 and extending rearwardly therefrom.

Figure 2 shows a fan means used with the corn picker shown in Figure 1. This means comprises a pair of housings 26 positioned adjacent one another and having discharge outlets 27 at opposite sides, shafts 28 within the housings 26, and fans 29 mounted upon the shafts. Figures 1 and 4 show the mounting of the fan means of Figure 2 upon the harvester 14. As seen in Figure 4, the housings 26 are connected to one another by straps 30 and are positioned directly over the lower receiving end of the wagon elevator 23 between the chutes 24. The housings 26 are supported upon the chutes 24 by straps 31 which partially embrace and are secured to the housings 26 and also have their ends secured to the chutes 24. The fan shafts 28 are mounted on the housings 26 by means of brackets 32. The fans 29 are driven from pulleys 33 secured to the shafts 28 and driven in turn by belts 34 driven in turn by pulleys 35 secured upon a shaft extending from the rear of a gear box 36. The gear box is mounted upon the tube 18, as more fully shown in applicant's aforementioned copending application, and receives drive from a power take-off shaft 37 extending from the rear of the tractor 10. Transverse shafts 38 extend from the gear box 36 to the rear end of the units 17 for the purpose of transmitting drive through, as more fully shown in applicant's aforementioned copending application. As is evident from Figures 1 and 4, the fans 29 direct blasts of air through the outlets 27 in opposite directions from the forward end of the wagon elevator toward the unit 17 against the flow of corn from the husker units to the wagon elevator. Baffles 39 are pivotally mounted, as indicated at 40, at the outer ends of the chutes 24. Their position may be adjusted by links 41 connected at one end to the baffles 39 and at the other end to a pin 42 on the chutes 24 in slots 43 in the links 41. The relative position of the baffles 39 provides a control of the blasts directed by the fans 29; that is, the proper positioning of the baffles 39 may prevent corn from being blown over the outer ends of the chutes 24.

Figure 5:
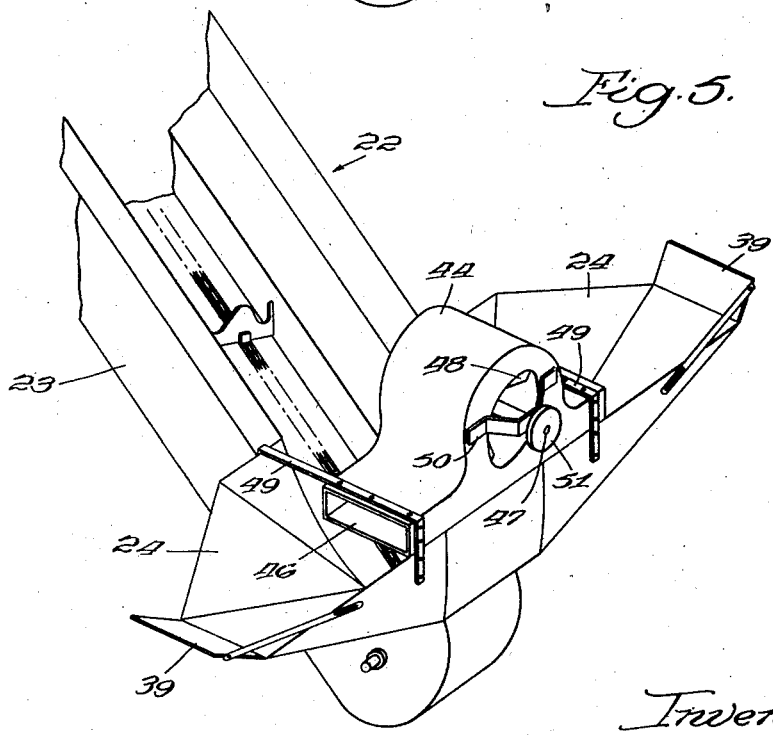
Figure 5 is a similar perspective showing a single fan.

Figure 3 illustrates a modified fan means which is composed of a single fan housing 44 having oppositely directed outlets 45 and 46, a fan shaft 47, and a fan proper 48. As seen in Figure 5, the fan housing 44 is mounted on chutes 24 by straps 49 in a manner similar to that shown in Figure 4. A bracket 50 supports the shaft 47 in the housing 44, and the fan 48 is driven by a pulley 51 secured to the shaft 47. The pulley 51 is in turn driven from the power take-off to the tractor in a manner similar to that in which the pulleys 33 of Figures 1 and 4 are driven. Adjustable baffles 39 are provided at the outer ends of the chutes 34, as in Figure 4.

The operation of the corn picker 14 need not be described in detail, since it is conventional. The tractor 10 is driven through rows of corn, and corn is snapped by the picking units 16 and is husked by the units 17. The husked ears, along with some trash and husks, are discharged from the rear end of the husker units 17 into the chutes 24 and moved downwardly along the chutes 24 to the forward receiving end of the wagon elevator 23. During this time blasts of air are directed along the chutes 24 against the direction of movement of the corn either by the two fans shown in Figures 1 and 4 or by the single fan shown in Figures 3 and 5 and cause the trash and husks to be separated from the corn and to be blown outwardly over the outer ends of the chutes 24.

Figures 6 and 7 show still another form of fan means and a special mode of mounting the same. As seen in Figure 7, the fan means comprises a housing 52 having oppositely directed outlets 53, a shaft 54 carried upon a bracket 55 secured to the housing 52, and fan elements 56. It will be observed that the fan shaft 54 extends transversely with respect to the wagon elevator 23 instead of longitudinally thereof, as in Figures 4 and 5.

The fan housing 52 is positioned over the forward receiving end of the wagon elevator 23 and is supported by straps 57 which partially embrace it and have their ends secured to the wagon elevator 23 and to the chutes 24. The fan shaft 54 is driven by a pulley 58 secured thereto and in turn driven by a belt 59 driven in turn by a pulley 60. The pulley 60 is secured upon a shaft 61 extending through the wagon elevator 23 and carrying at the opposite side of the wagon elevator a pulley 62. The pulley 62 is driven by a belt 63 driven in turn by a pulley 64 secured upon a shaft 65 extending through the forward end of the wagon elevator and driving the same. This shaft 65 is driven by a pulley 66 secured to its other end and driven in turn by a belt 67 which is driven by a pulley 68 mounted upon one of the transverse shafts 38 extending from the gear box 36. As seen in Figure 6, the fan outlets 53 are so curved and directed that they will direct blasts of air not completely transverse with respect to the wagon elevator 23, as in the case of the fans of Figures 4 and 5, but at a slight angle to the transverse toward the side to which the wagon elevator 23 extends. Thus, the air blasts are not directed directly against the flow of corn from the husker units 17 along the chutes 24 to the wagon elevator 23 but at a slight angle thereto so that any tendency to blow the corn over the sides of the chutes 24 is avoided.

It will be apparent from the foregoing description that novel fan arrangements for corn pickers have been provided. In the arrangements of Figures 4 and 5, there is novelty not only in the positioning of the fans over the forward end of the wagon elevator but also in the mounting of the fans upon the chutes connecting the wagon elevators and the husker units. In the case of Figure 7, there is novelty in the positioning of the fan in the direction of blasts produced by the fan, in the mounting of the fan, and in the drive of the fan.

The intention is to limit the invention only within the scope of the appended claims.

What is claimed is:

1. In combination, a longitudinally-extending corn-harvesting unit adapted to be positioned along a tractor and to be mounted at one side thereof, a wagon elevator displaced laterally from the unit and extending rearwardly therefrom, a chute extending transversely between the unit and the wagon elevator for transferring corn from the unit to the elevator, fan means positioned to direct a blast of air along the chute toward the unit against the flow of corn from the unit to the elevator, an upwardly extending baffle positioned at the corn-harvesting unit end of the transferring chute, and means for adjustably mounting the baffle on the chute.

2. In combination, longitudinally-extending corn-harvesting units adapted to be positioned at opposite sides of a tractor and mounted thereon, a wagon elevator extending rearwardly from the rear of the tractor between the units, means for transferring corn from the units transversely to the forward end of the wagon elevator, fan means positioned over the forward end of the wagon elevator and directing blasts of air along the transferring means toward the units, upwardly-extending baffles positioned adjacent the outer ends of said means, and means for adjustably mounting the baffles on the chutes.

BENJAMIN M. HYMAN.